United States Patent [19]

Hashimoto et al.

[11] Patent Number: 4,743,896

[45] Date of Patent: May 10, 1988

[54] ELECTRODE PATTERN FOR A LIQUID CRYSTAL DISPLAY

[75] Inventors: Sadakatsu Hashimoto, Nara; Shintaro Hashimoto, Ikoma, both of Japan

[73] Assignee: Sharp Kabushiki Kaisha, Osaka, Japan

[21] Appl. No.: 86,507

[22] Filed: Aug. 18, 1987

Related U.S. Application Data

[63] Continuation of Ser. No. 856,435, Apr. 22, 1986, abandoned, which is a continuation of Ser. No. 504,862, Jun. 16, 1983, abandoned.

[30] Foreign Application Priority Data

Jun. 17, 1982 [JP] Japan .................. 57-104888

[51] Int. Cl.$^4$ .............................................. G09G 3/36
[52] U.S. Cl. .................... 340/784; 340/752; 340/765
[58] Field of Search ............... 340/765, 784, 805, 752, 340/795, 796, 785; 350/332, 333, 334, 336, 338

[56] References Cited

U.S. PATENT DOCUMENTS

| | | | |
|---|---|---|---|
| 4,109,242 | 8/1978 | Channin | 340/784 |
| 4,126,383 | 11/1978 | Doriguzzi et al. | 350/338 |
| 4,212,011 | 7/1980 | Waldron | 340/784 |
| 4,380,372 | 4/1983 | Taguchi | 350/346 |
| 4,412,214 | 10/1983 | Tanaka et al. | 340/765 |
| 4,429,979 | 2/1984 | Terada | 340/765 |
| 4,443,115 | 4/1984 | Kanoko et al. | 340/785 |
| 4,529,274 | 7/1985 | Iwata | 340/785 |

Primary Examiner—Gerald L. Brigance
Attorney, Agent, or Firm—Birch, Stewart, Kolasch & Birch

[57] ABSTRACT

An electrode pattern for a liquid crystal display comprises an electrode pattern having at least one dummy scan and/or signal electrode at a region other than a display pattern having true scan electrodes and true signal electrodes for displaying a specific display indicia. A circuit is provided for applying an OFF voltage to the dummy scan and/or signal electrode, the OFF voltage making this dummy electrode erased. The dummy electrodes are positioned and spaced in a manner identical to the true electrodes to simulate the overall appearance of the true electrode display region.

2 Claims, 3 Drawing Sheets

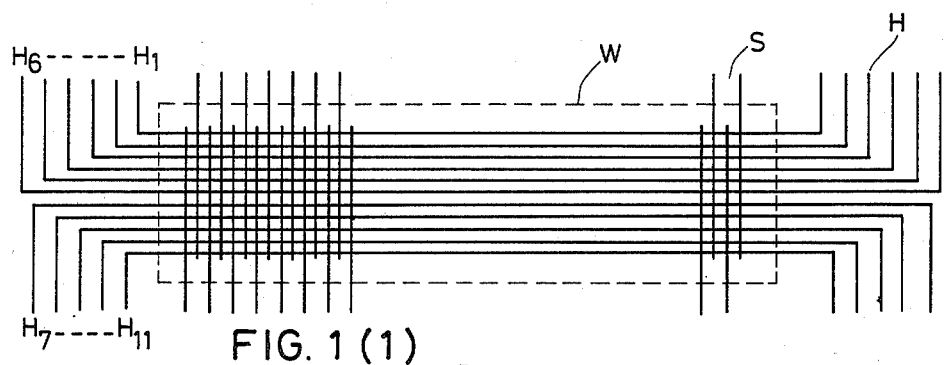
FIG. 1 (1)
FIG. 1 (2)
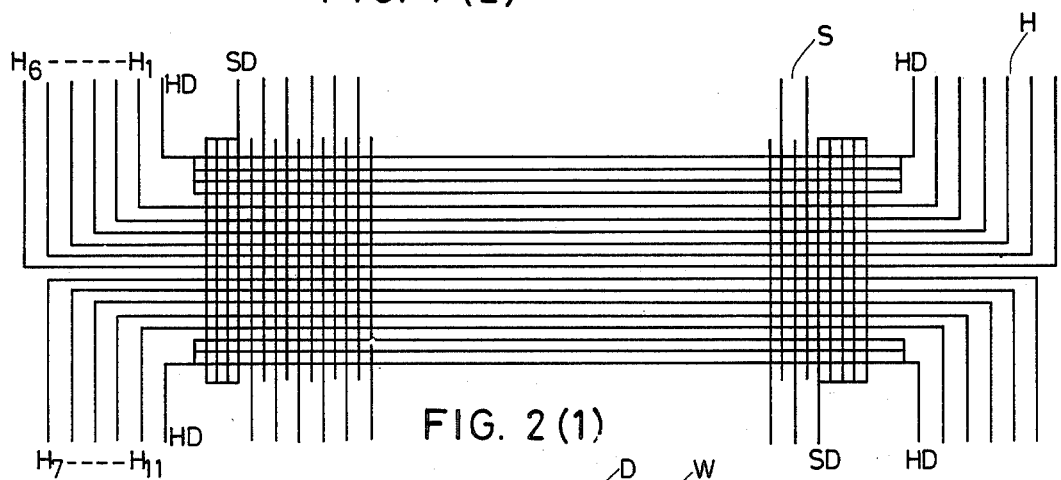
FIG. 2 (1)
FIG. 2 (2)

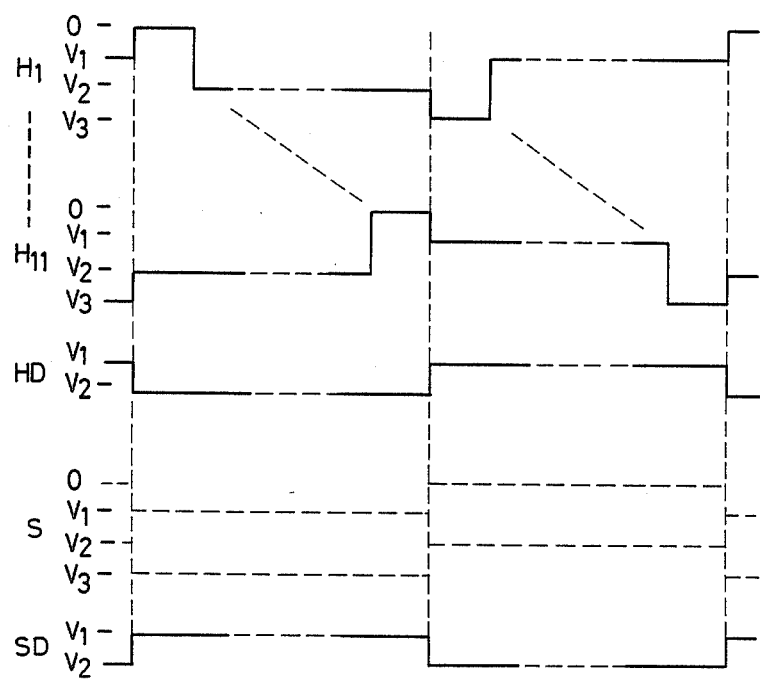
FIG. 3 (3)
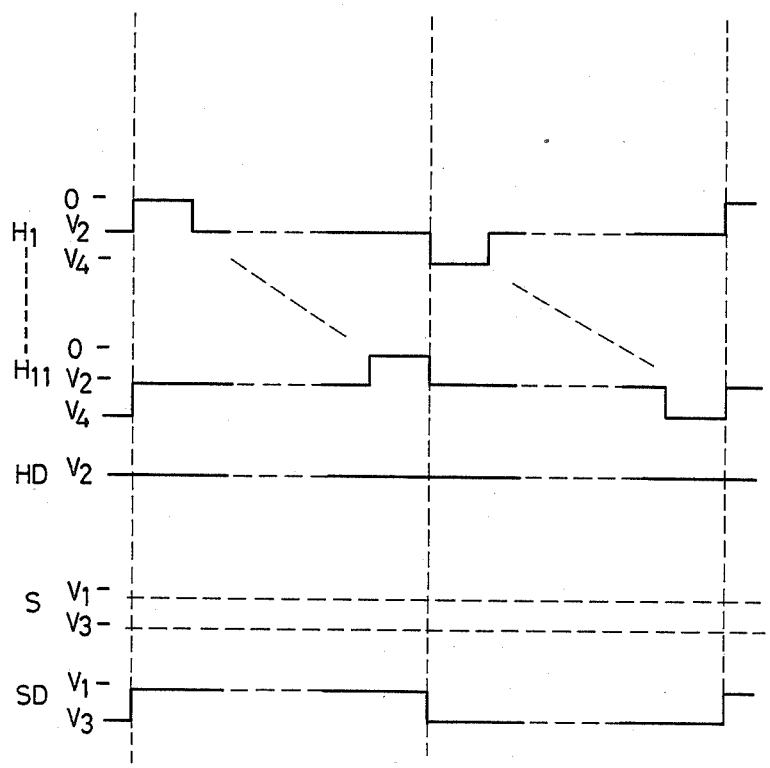
FIG. 3 (4)

ELECTRODE PATTERN FOR A LIQUID CRYSTAL DISPLAY

This application is a continuation of application Ser. No. 856,435, filed on Apr. 22, 1986, now abandoned, which in turn is a Continuation of Ser. No. 504,862 filed on June 16, 1983, now abandoned.

BACKGROUND OF THE INVENTION

The present invention relates to an electrode pattern for a display device and, more particularly, to an electrode pattern for a liquid crystal display device suitable for dynamic operation.

Liquid crystal displays suitable for a dynamic mode of operation comprise scan electrodes and signal electrodes opposed in a matrix fashion.

FIGS. 1(1) and 1(2) show a structure of a conventional electrode arrangement suitable for a dot-matrix type liquid crystal display. In FIG. 1(1), back plate electrodes H(H1 to H11) serving as scan electrodes and segment electrodes S serving as signal electrodes are provided and are framed by a display window W. As FIG. 1(2) shows, a crossover region D1 between the back plate electrodes H and the segment electrodes S provides an area in which a visible indicia is to be displayed.

Since the conventional electrode arrangement is driven with an off-bias method, non-selected picture elements may have a different shade and thus be visible depending on the viewing angle or the ambient temperature. In particular, when a multiple duty drive mode is applied to the electrode arrangement, this tendency can be enhanced, so that, even according with a normal ambient temperature and viewing angle, the non-selected picture elements have a different shade and are therefore faintly visible. On the contrary, the remaining region D2 except for the region D1 within the window W appears transparent since no voltage is applied to this region. Thus, as the display region D1 has a different shade, the presence of this region appears, undesirably, so that the uniform shade of the display is impaired.

Therefore, it is desired to provide an improved electrode pattern suitable for a liquid crystal display to shade the display uniformly by canceling the difference in shade between a region having the electrode wirings for displaying and the remaining region.

OBJECT AND SUMMARY OF THE INVENTION

Accordingly, it is an object of the present invention to provide an improved electrode pattern for a liquid crystal display to render the shade of the display, when unenergized, uniform.

It is another object of the present invention to provide an improved electrode pattern for a liquid crystal display to cancel the visibility of a region including electrode wirings when not in use.

Briefly described, in accordance with the present invention, an electrode pattern for a liquid crystal display is featured by comprising dummy scan/signal electrodes disposed in regions other than a display region including true scan electrodes and true signal electrodes opposed in a matrix fashion for displaying a specific display indicia. A circuit is provided for driving the liquid crystal display by applying a voltage to the dummy scan/signal electrodes and counter electrodes the voltage being substantially identical to that applied to at least one non-selected picture element among picture elements in the display region.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1(1) and 1(2) show a conventional electrode pattern for a dot-matrix type liquid crystal display;

FIGS. 2(1) and 2(2) show an electrode pattern for a dot-matrix type liquid crystal display according to the present invention.

DESCRIPTION OF THE INVENTION

FIGS. 2(1) and 2(2) show an electrode pattern for a dot-matrix type liquid crystal display.

The electrode pattern of FIGS. 2(1) comprises dummy back plate electrodes HD and dummy segment electrodes SD in addition to true back plate electrodes H(H1 to H11) serving as scan elctrodes and true segment electrodes S serving as signal electrodes. FIG. 2(2) shows a visible pattern of an electrode pattern of that of FIG. 2(1) in the unenergized state. As FIG. 2(2) shows, the display region within the window W is entirely occupied by the electrode wirings to cancel the region D2 in FIG. 1(2) because at least either the dummy back plate electrodes HD or the dummy segment electrodes SD are positioned at the region D2 in combination with either the true back plate electrodes H or the true segment electrodes S.

The dummy back plate electrodes HD and the signal electrodes SD are shortcircuited to each other within the display cell, so that only a single terminal is required for each combination of the dummy back plate electrodes HD and the dummy segment electrodes SD.

Figure 3:
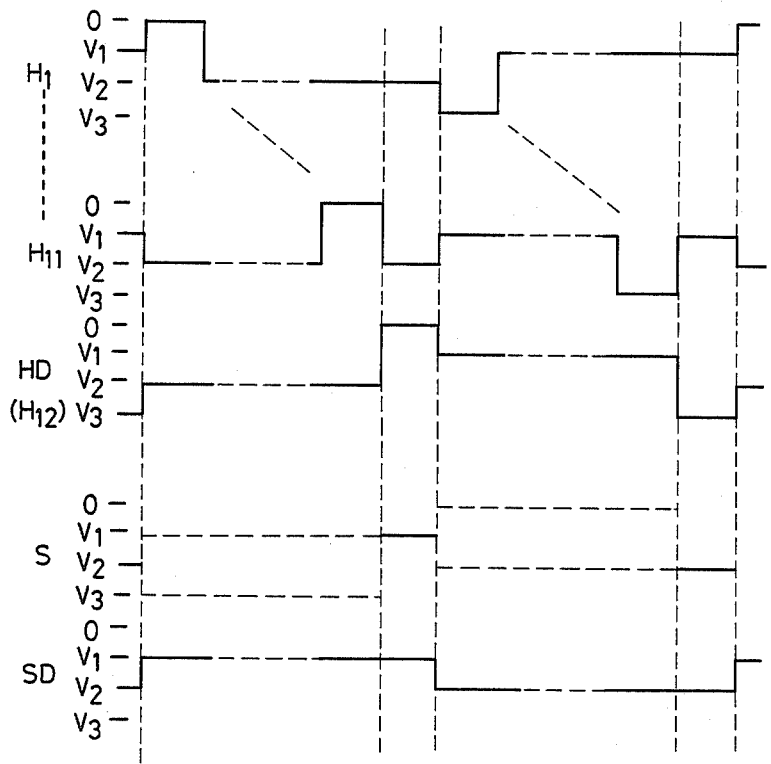
FIGS. 3(1) and 3(4) show a time chart of signals applied to the electrode arrangement of FIGS. 2(1) and 2(2).
Figure 3:
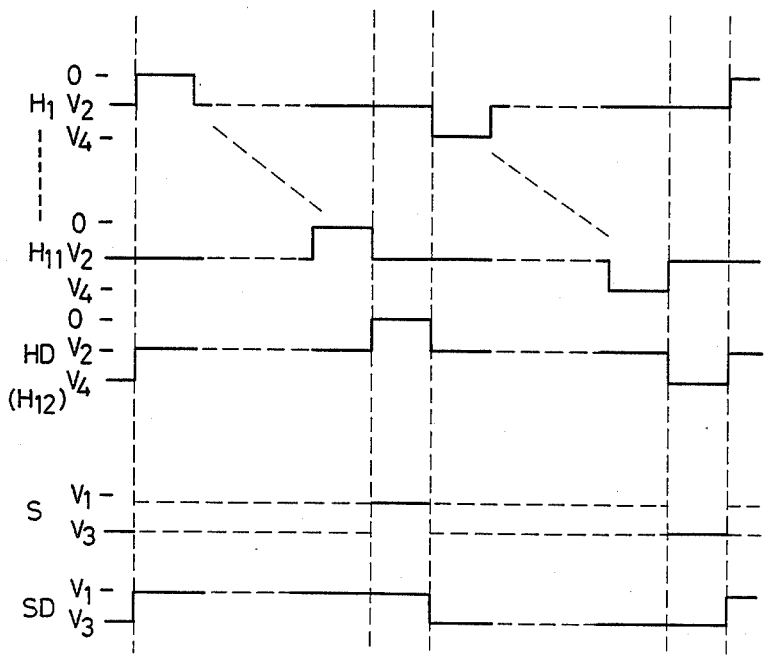

FIGS. 3(1) to 3(4) show a time chart of ⅓ bias drive mode signals applied to the back plate electrodes H1 to H11, the dummy back plate electrodes HD, the true segment electrodes S, and the dummy segment electrodes SD using a conventional drive circuit. In FIGS. 3(1) to 3(4), voltages V1, V2, V3, and "0" satisfy the following relation:

$$V1 = V2 - V1 = V3 - V2 = V4 - V3$$

According to the application of the signals of FIGS. 3(1) to 3(4), an off-bias voltage to be applied to at least one non-selected picture element is actually applied to a region having either the dummy back plate electrodes HD or the dummy segment electrodes SD, so that the picture elements in this region remain erased. The region having either the dummy back plate electrodes HD or the dummy segement electrodes SD means the following regions:

1. the region having the dummy back plate electrodes HD, and either the true segment electrodes S or the dummy segment electrodes SD along the top and the bottom sides within the display region framed by the window W 2. the region having the true back plate electrode H1 to H11 and the dummy segment electrodes SD along the right and the left sides within the display region framed by the window W Therefore, the entire area in the window W provides a uniform shade when unenergized according to the present invention since the region D2 of FIG. 2(2) is prevented from becoming visible.

While only certain embodiments of the present invention have been described, it will be apparent to those skilled in the art that various changes and modifications may be made therein without departing from the spirit and scope of the present invention as claimed.

What is claimed is:

1. A matrix display panel comprising:
   first and second spaced apart non-conductive substrates;
   an active display material disposed between said first and second substrates;
   a plurality of active display scan electrodes disposed on said first substrate, arranged in parallel and spaced apart from each other by a first predetermined distance;
   a plurality of active display signal electrodes disposed on said second substrate, arranged in parallel and spaced apart by a second predetermined distance, each of said active display signal electrodes orthogonally intersecting each of said active displat scan electrodes; P1 the orthogonally intersecting portions of said active display signal electrodes and active display scan electrodes defining an active display portion of said panel, said panel further including a visible non-display portion;
   a plurality of dummy display scan electrodes disposed on said first substrate in said non-display portion of said panel, a plurality of said dummy display scan electrodes being arranged adjacently with each other and in parallel to said active display scan electrodes in each of a top and a bottom portion of said visible non-display portion having said active display portion therebetween and being spaced apart from each other and from said active display scan electrodes;
   a plurality of dummy display signal electrodes disposed on said second substrate in said non-display portion of said panel, a plurality of said dummy display signal electrodes being arranged adjacently with each other and in parallel to said active display signal electrodes in each of first and second side portions of said visible non-display portion having said active display portion therebetween and being spaced apart from each other and from said active display signal electrodes;
   said dummy display signal electrodes being commonly connected together, said dummy display scan electrodes being also commonly connected together;
   said active display scan electrodes and dummy display scan electrodes being uniformly distributed across said first substrate over the entirety of said active display portion and non-display portion of said panel;
   said active display signal electrodes and dummy display signal electrodes being uniformly distributed across said second substrate over the entirety of said active display portion and non-display portion of said panel;
   said active display scan and display signal electrodes being driven to develop a desired pattern on said active display portion of said panel, nonenergized portions of said active display portion having their corresponding active display scan electrodes and active display signal electrodes being driven with an erase waveform;
   said dummy display signal electrodes and said dummy display scan electrodes being continuously driven by said erase waveforms to develop an appearance equivalent to nonenergized portions of said display.

2. The panel of claim 1 wherein said active display material is a liquid crystal material.

* * * * *